(12) United States Patent
McKiou

(10) Patent No.: US 8,972,803 B2
(45) Date of Patent: Mar. 3, 2015

(54) RUN-TIME DEFAULT DETECTION IN A COMPONENT ASSOCIATED WITH AN APPLICATION PROGRAMMING INTERFACE PLATFORM

(71) Applicant: Alcatel-Lucent USA Inc., Murray Hill, NJ (US)

(72) Inventor: Kevin W. McKiou, Naperville, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 185 days.

(21) Appl. No.: 13/677,030

(22) Filed: Nov. 14, 2012

(65) Prior Publication Data
US 2014/0136898 A1    May 15, 2014

(51) Int. Cl.
*G06F 11/07*    (2006.01)

(52) U.S. Cl.
USPC .......................................................... 714/55

(58) Field of Classification Search
CPC . G06F 11/07; G06F 11/0793; G06F 11/0745; G06F 11/076; G06F 11/0757; G06F 11/0766; G06F 11/1479; G06F 11/36; G06F 11/28
See application file for complete search history.

(56) References Cited

U.S. PATENT DOCUMENTS

| | | | | |
|---|---|---|---|---|
| 6,018,759 | A * | 1/2000 | Doing et al. | 718/108 |
| 6,212,544 | B1 * | 4/2001 | Borkenhagen et al. | 718/103 |
| 7,958,402 | B2 * | 6/2011 | Lee et al. | 714/38.1 |
| 8,495,430 | B2 * | 7/2013 | Lee et al. | 714/38.1 |
| 8,694,831 | B2 * | 4/2014 | Arapov et al. | 714/38.1 |
| 2003/0135781 | A1 * | 7/2003 | Da Palma et al. | 714/2 |
| 2003/0233394 | A1 * | 12/2003 | Rudd et al. | 709/107 |
| 2006/0161800 | A1 * | 7/2006 | Dathathraya et al. | 714/4 |

* cited by examiner

*Primary Examiner* — Nadeem Iqbal
(74) *Attorney, Agent, or Firm* — Wolff & Samson

(57) ABSTRACT

Methods and apparatuses for fault detection in a component associated with an application programming interface platform are provided. In an embodiment, the component is determined to have been invoked to process a transaction. A forward progress counter is monitored to determine whether the component is processing the transaction, wherein the forward progress counter increments at determined intervals when the component is processing the transaction. A test transaction is executed for the component when a determination is made that the forward progress counter has not incremented for a threshold fault period. A fault alarm indicator is generated based on the determination that the forward progress counter has not incremented for the threshold fault period.

20 Claims, 6 Drawing Sheets

RUN-TIME DEFAULT DETECTION IN A COMPONENT ASSOCIATED WITH AN APPLICATION PROGRAMMING INTERFACE PLATFORM

TECHNICAL FIELD

The present disclosure is generally directed to run-time fault detection, and more specifically to run-time fault detection for components associated with an application programming interface platform.

BACKGROUND

Communication service providers (also referred to herein as CSPs) are finding themselves in the midst of multiple evolutions in usage, end-point technology, monetization models and top-valued services. As such, communication service providers must profitably leverage their network capabilities, provide novel differentiating services and, in some cases, accommodate third-party developers.

In response to current demands, communication service providers currently offer a variety of services to operate, manage and maintain open application programming interface (API) platforms. By definition, open API platform assets are routinely exposed. As such, challenges for providers that implement open API platforms include protecting network interfaces from general access (i.e., security), efficiently providing network authorizations and enforcing service level agreements.

The architecture of an open API platform may be designed to accommodate various internal components and external components, including third-party components, to provide services. For example, open API platforms can be designed to accommodate external components to provide network-based messaging services, network-based location services (e.g., geo-fencing), secure commercial payment services (e.g., mobile banking) and bandwidth management for guaranteed quality of service (QoS), (e.g., for delivering and streaming mobile video).

In addition, run-time fault detection is generally essential to operate, manage and maintain services associated with an open API platform. Run-time fault detection includes a determination of whether a component is currently processing a transaction or has frozen or failed. One issue for API platform run-time fault detection (and other API platform operations) is that a variety of components that lack homogeneity must be accommodated. As such, an ideal infrastructure for fault detection and other operations would be applicable system-wide and implemented in a regular and repeatable fashion. Therefore, it would be advantageous to design an infrastructure to efficiently detect run-time faults across the many internal and external components of an open API platform.

SUMMARY

Methods and apparatuses for fault detection in a component associated with an application programming interface platform are provided. In accordance with an embodiment, a component is determined to have been invoked to process a transaction. A forward progress counter is monitored to determine whether the component is processing the transaction, wherein the forward progress counter increments at determined intervals when the component is processing the transaction. A test transaction is executed for the component when a determination is made that the forward progress counter has not incremented for a threshold fault period, and a fault alarm indicator is generated based on the determination that the forward progress counter has not incremented for the threshold fault period. The threshold fault period may be a threshold number of time intervals. The component may include the forward progress counter, and the application programming interface platform may be an open platform associated with a communication service provider. The component may be one of a service component, an enabler component and an external component with respect to the application programming interface platform.

In accordance with an embodiment, a recovery action may be determined for the component based on the fault alarm indicator, and the fault alarm indicator may be transmitted to a fault monitoring component.

These and other advantages of the invention will be apparent to those of ordinary skill in the art by reference to the following detailed description and the accompanying drawings.

DETAILED DESCRIPTION

Figure 1:
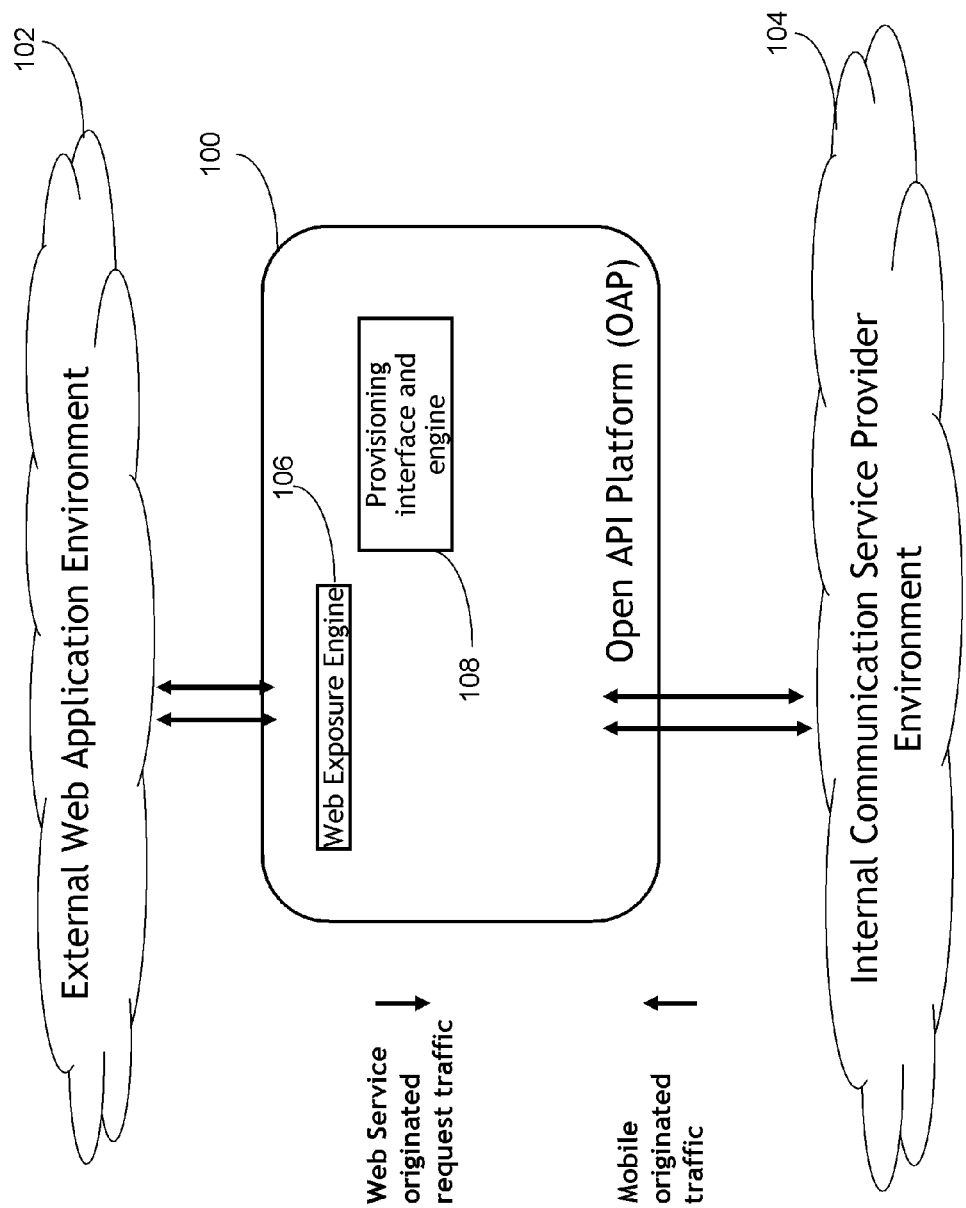
FIG. 1 illustrates an overview diagram of an application programming interface platform in accordance with an embodiment.

Methods and apparatuses for fault detection in a component associated with an application programming interface platform are provided. FIG. 1 illustrates an overview diagram of an application programming interface platform in accordance with an embodiment. In FIG. 1, application programming interface platform 100 (which also may be referred to herein as API platform 100) bridges an external web application environment 102 and an internal communication service provider environment 104, and includes various functional capabilities to provide services to users (e.g., subscribers to communication service provider).

Services may comprise one or more transactions. In general, services may be associated with a network-based functional capability such as, for example, network-based messaging services, network-based location services, secure commercial payment services and bandwidth management for guaranteed quality of service (QOS). Services also may be associated with a combination of network-based functional capabilities (i.e., composite functions). Such services are generally referred to herein as complex services.

As can be seen in FIG. 1, platform 100 includes one or more elements to process real-time and operational traffic to provide services. For example, a first element, exposure engine 106, may provide platform access control, security and transaction logging services for analytics and billing. Exposure engine 106 may include one or more interfaces to the public Internet (e.g., to Web services) in addition to one or more interfaces to private or protected networks. In one embodiment, exposure engine 106 may be the sole external gateway to platform 100, such that platform 100 need not include redundant gateway-type functionality, such as for authorization and authentication of users. As such, provisioning and interface engine 108 may be designed specifically for high-volume processing of real-time data traffic and complex functions between external web application environment 102 and internal communication service provider environment 104, such as inter-working and coordinating network interfaces, executing service logic, policy enforcement, transactions with long-term states, monitoring and control of services and recording transactions for monetization and data collection.

As such, a core function of platform 100 is to process real-time request traffic flowing between external applications and exposed network elements to provide services. In one embodiment, real-time request traffic may require one or more of service normalization, service mediation and service composition.

Service normalization can refer to receiving multiple interface types (such as one or more of the various interface types utilized in a typical communication network, e.g., for sending messages and receiving location information) and providing normalized interfaces (e.g., representational state transfer (REST) or simple object application protocol (SOAP) interfaces) to external web application environment 102. Thus, service normalization includes streamlining one or more protocols for exposing internal communication service provider environment 104 services to external web application environment 102 (i.e., web-based) applications.

Service mediation can refer to receiving an incoming request and performing an operation associated with the incoming request such as, for example, modifying an incoming request based on run-time circumstances or applying policy enforcement rules to an incoming request. For example, service mediation may include transformation, such as from extensible markup language (XML) to JavaScript object notation (JSON), or policy enforcement (e.g., of a service level agreement (SLA)).

Service composition can refer to combining multiple functional elements into a composite function. For example, a composite function (also referred to herein as a complex service) may retrieve a location and send the result in a message, look up group identities and send a message to each member of a group, send messages to a member of a group when the member enters a selected geographical area, etc. In addition, larger, more complex functions such as authorization/privacy enforcement and quality of service control/privacy enforcement may be encompassed by service composition capabilities. Service composition may also be used for customer-specific modifications to basic functional capabilities.

Figure 2:
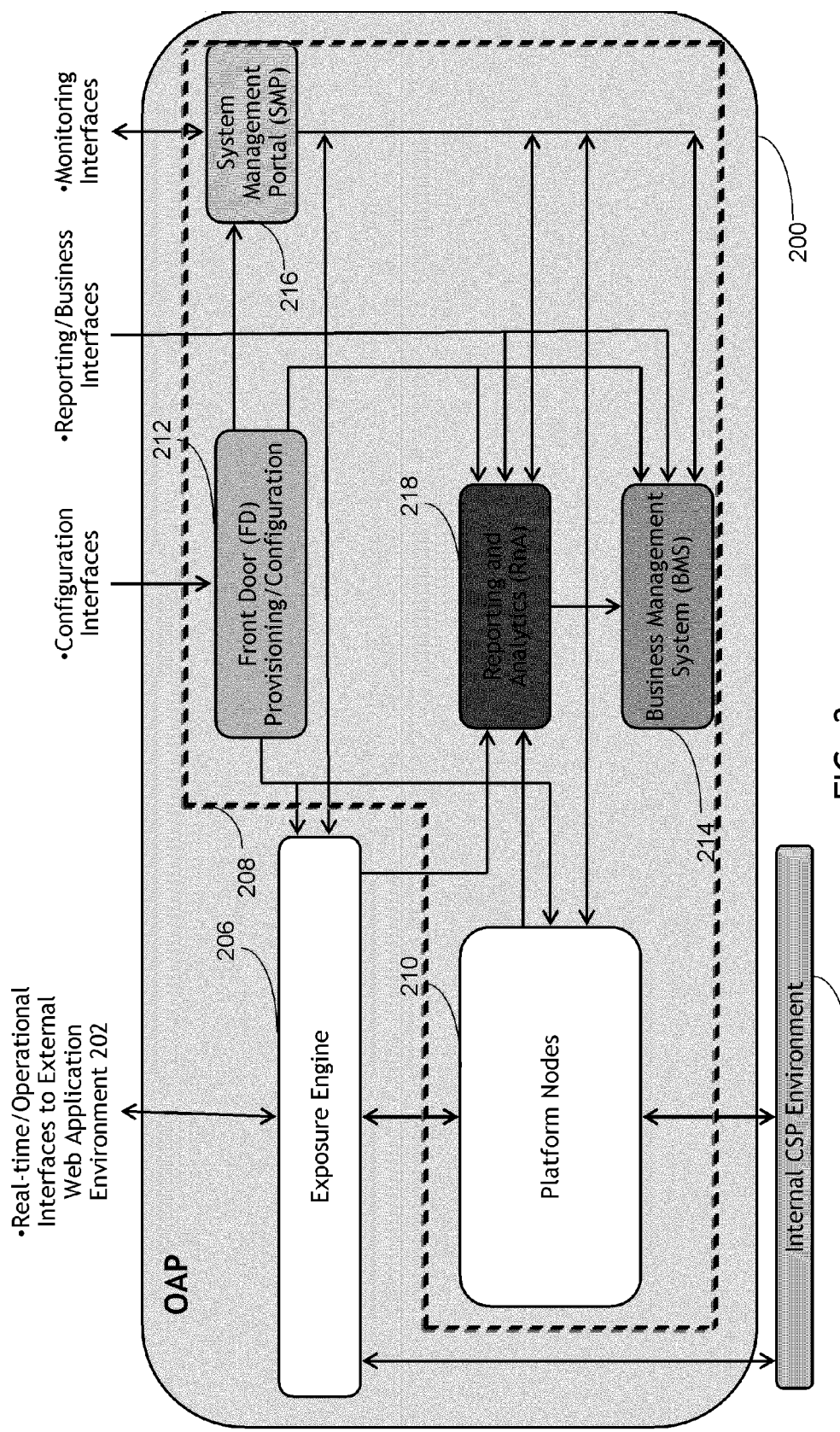
FIG. 2 illustrates an architectural diagram of an application programming interface platform in accordance with an embodiment.

FIG. 2 illustrates an architectural diagram of an application programming interface platform in accordance with an embodiment. In particular, provisioning and interface engine 208 of application programming interface platform 200 may include a one or more elements such as one or more platform nodes 210 that provide programming interfaces to external web application environment 102. For example, a platform node 210 may expose network resources via Application Programming Interfaces based on hypertext transfer protocol (HTTP) requests such as REST or SOAP requests. A platform node 210 also may configure and deploy new software associated with a service, and include reporting and analytics capabilities. In one embodiment, platform 100 may provide an environment in which one or more components may be interconnected to provide composite services.

Front door component 212 may include one or more interfaces to configure and activate one or more platform nodes 210 and components within each platform node to provide services. For example, front door component 212 may associate platform services with external (e.g., third-party) applications and promotional campaigns, and establish billing rules based on transactions executed by platform nodes via billing management system 214.

A platform node 206 also may interact with system management portal (SMP) 216 by, for example, exposing management information, raising execution alarms when appropriate and sending measurement counter records (MCRs) to system management portal 216. In one embodiment, system management portal 216 may employ a correlation function to correlate alarm data received from the various platform elements, including one or more platform nodes. In another embodiment, a platform node 206 may transmit transaction data records to reports and analytics element 218, which may in turn interact with system management portal 216 regarding selected transaction data.

Figure 3:
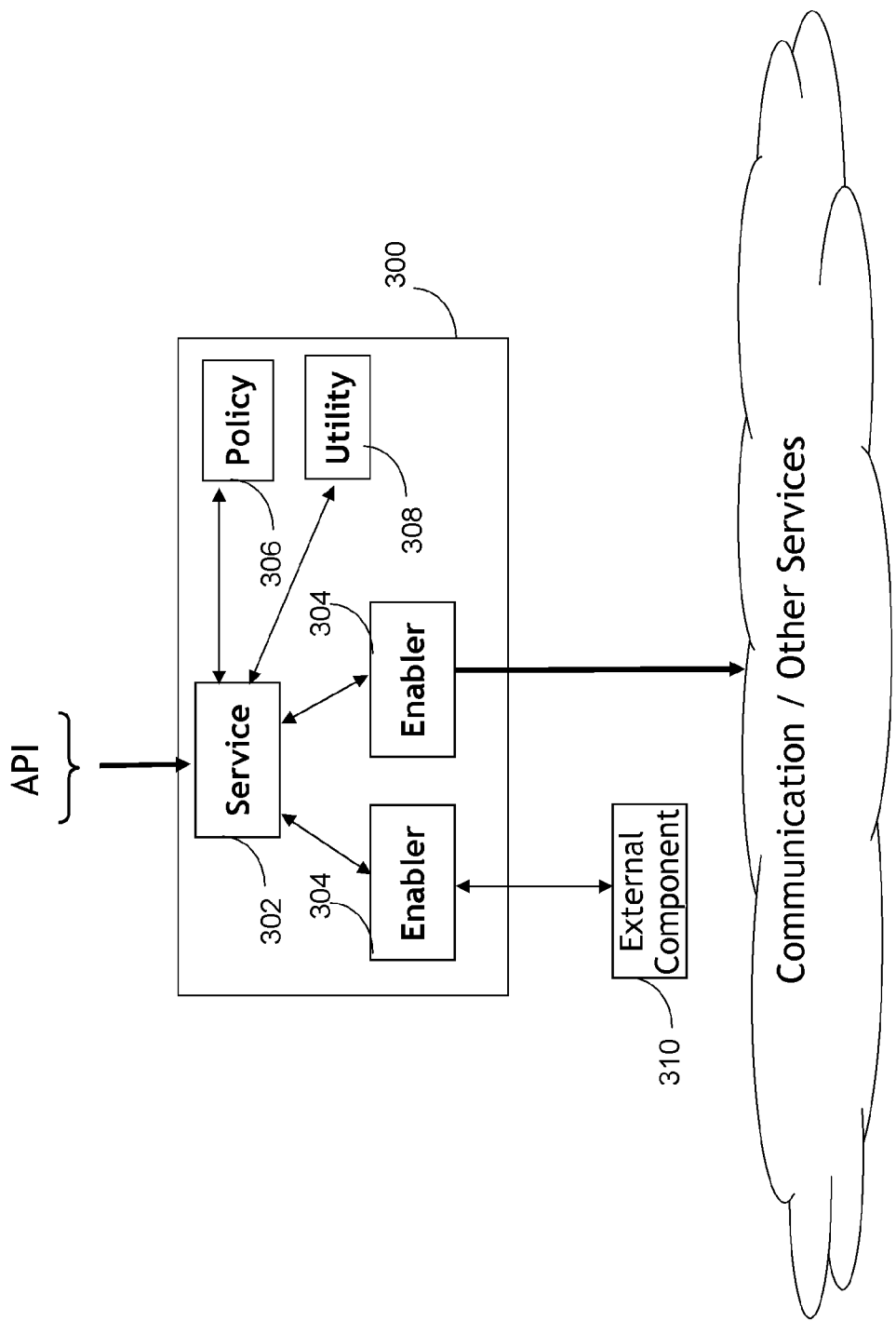
FIG. 3 illustrates a functional diagram of application programming interface platform components in accordance with an embodiment.

FIG. 3 illustrates a functional diagram of application programming interface platform components in accordance with an embodiment. As described above, an open API platform generally serves as bridge between a web application environment and a communication system environment to provide communication service provider services. To that end, platform 300 may include a variety of specialized platform nodes that enable such interaction. In one embodiment, specialized components may include service components 302 to execute transactions, enabler components 304 to provide access to an external service or element (e.g., for complex transactions), policy components 306 (e.g., to access and enforce rules) and utility components 308 (e.g., to record metrics and perform other tasks).

In one embodiment, service component 302 may provide interfaces for real-time transactions. Such interfaces may support any IP-based protocol, including REST or SOAP protocols. For example, service components may provide pass-through services (e.g., to send an SMS message), or complicated services that access internal data from policy components 306 or utility components 308 or external components 310 (via an enabler component 304).

In one embodiment, service component 302 can be an element for providing a complex service requiring one or more components of various types. For example, a complex service may require multiple layers of service and enabler components for execution (e.g., QoS control and bandwidth management service). Therefore, service components may inter-work with particular enabler, policy and utility components to provide a service. For example, a service component may report transaction events to one or more enabler components 304.

Figure 4:
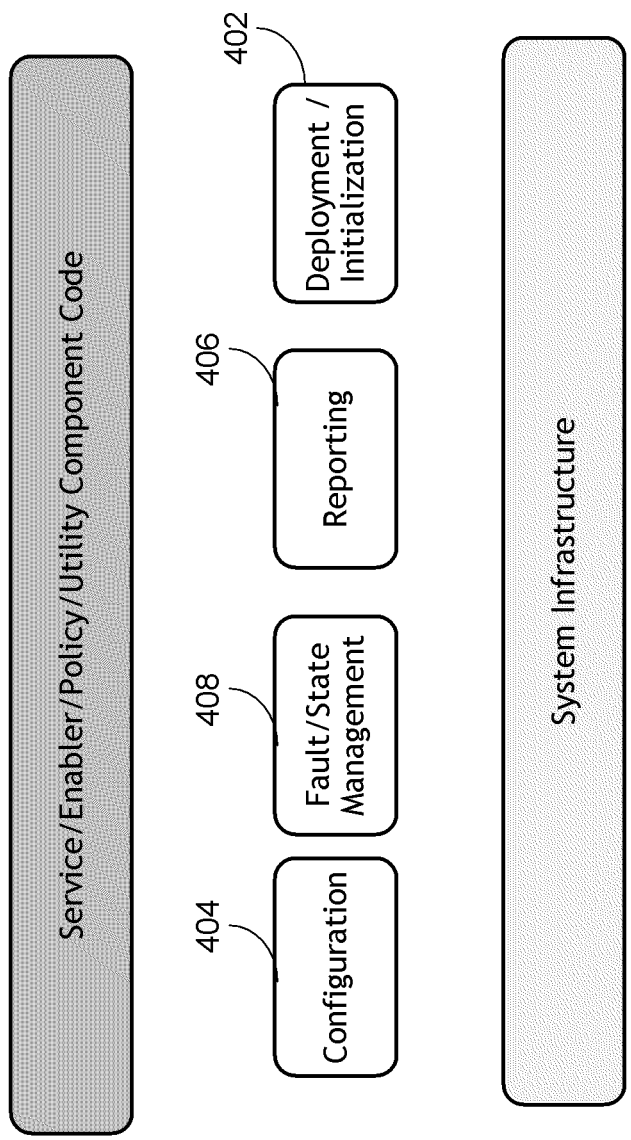
FIG. 4 illustrates a code and supporting infrastructure diagram of an application programming interface platform component in accordance with an embodiment.

FIG. 4 illustrates a code and supporting infrastructure diagram of an application programming interface platform component in accordance with an embodiment. For example, platform 300 may be advantageously designed to include functional infrastructure that can be utilized in a regular and repeatable fashion. As such, the component architecture 400 may be designed to include core components to streamline component development. For example, the deployment/initialization 402, configuration 404 and reporting 406 (i.e., data handling) capabilities of component 400 may be streamlined into core components to handle administrative, deployment and overload states. Transaction data records and measurement counter records also may be constructed and managed via core components.

Fault management infrastructure 408 also may be streamlined. In various embodiments, a forward progress counter may be utilized as a repeatable functional infrastructure element for system health monitoring and fault detection. For example, a service component may monitor and report on its own health by utilizing a forward progress counter. A local (internal) forward progress counter may be incremented every time a transaction is processed by a component. Therefore, as the service component makes forward progress (e.g., either by processing real or test transactions), the forward progress counter may be progressively incremented. Periodically, the service component may monitor the forward progress counter to determine if forward progress is being made. If forward progress is not detected, a test transaction designed to increment the forward progress counter may be launched to determine if the service component is functioning correctly.

In an alternative embodiment, the value of a local forward progress counter may be externally monitored. For example, if a selected number of intervals pass without the observed forward progress counter being incremented (i.e., the forward progress counter stops increasing in value for a sufficient time), a fault condition may be determined, and a fault alarm indicator may be generated for a recovery action to be taken, if necessary.

In another embodiment, a component may transmit a forward progress counter value to an external monitor that may determine a fault condition and generate a fault alarm indicator for a recovery action to be taken. For example, if the forward progress counter is reported to have stopped increasing in value for a selected amount of time (i.e., a fault interval), the external monitor may determine that the component associated with the forward progress counter is in a disabled operational state. The external monitor may then signal a state-change alarm (i.e., a fault alarm indicator) to, for example, one of a management information base or a system management portal (e.g., system management portal 210), such as via a Simple Network Management Protocol (SNMP) trap.

Referring back to FIG. 3, an enabler component 304 may monitor an external resource it is connected to and to report failed transactions. For example, enabler component 304 may monitor an external component 310 to determine if the external component is functional, or if it has failed or become unreachable. As such, in another embodiment enabler component 304 may include a forward progress counter to monitor fault conditions with respect to an external resource (e.g., a third-party application). For example, regardless of whether a fault condition is a result of an external component malfunction or a malfunction internal to enabler component 304, as long as the forward progress counter increments only if a transaction is being processed, operational faults can be detected.

Figure 5:
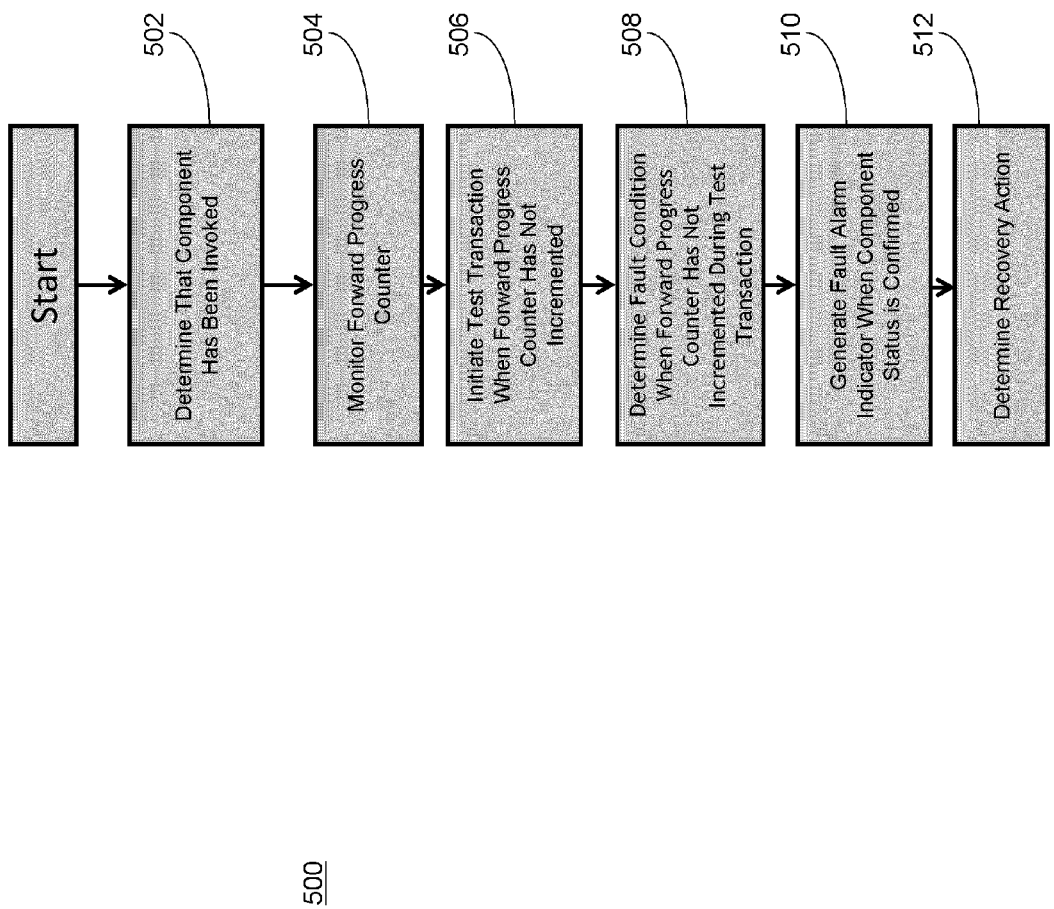
FIG. 5 illustrates a flowchart diagram of a method for fault detection in a component associated with an application programming interface platform in accordance with an embodiment.

FIG. 5 illustrates a flow chart diagram of a method for fault detection in a component associated with an application programming interface platform in accordance with an embodiment. As discussed above, in exemplary embodiments the application programming interface platform may be an open platform associated with a communication service provider. At 502, a component is determined to have been invoked to process a transaction by, for example, a service component. In an embodiment, the component may itself be a service component. Alternatively, the component may be an enabler component or external (e.g., third-party) component with respect to an open API platform associated with a communication service provider.

At 504, the service component monitors a forward progress counter to determine whether the software component is processing the transaction. In one embodiment, the component may be designed to include the forward progress counter. For example, an internal/local forward progress counter may be designed to increment at selected intervals when the component is processing the transaction. As such, the service component may monitor the forward progress counter by detecting when the forward progress counter has incremented. Alternatively, the service component may monitor the forward progress counter only at periodic time intervals, such as when the counter is expected to increment (e.g., when an application is expected to be executing).

At 506, a test transaction for the component may be initiated by the service component when a determination is made that the forward progress counter has not incremented for a threshold fault period. For example, a threshold fault period may define a threshold number of time intervals after which a test transaction is autonomously triggered when the forward progress counter has not incremented. At 508, a fault condition is determined when the forward progress counter has not incremented for a threshold fault period of the test transaction. For example, when the forward progress counter has not incremented for a threshold fault period of the test transaction, the service component may determine that the non-operational (e.g., frozen or delayed execution) status of the component is confirmed. As such, at 510, the service component may generate a fault alarm indicator based on a confirmed non-operational component status, and determine a recovery action for the component based on the fault alarm indicator at 512. For example, the recovery action may include transmitting the fault alarm indicator for the non-operational component to, for example, system management portal 210.

The systematic approach to fault detection described herein, can reduce run-time fault detection in a component to a method call and periodic checking of a forward progress counter. As a result, fault detection infrastructure needed to support application development may be reduced.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 5. Certain steps of the methods described herein, including one or more of the steps of FIG. 5, may be performed by a server or by another processor in a network-based cloud-computing system. Certain steps of the methods described herein, including one or more of the steps of FIG. 5, may be performed by a client computer in a network-based cloud computing system. The steps of the methods described herein, including one or more of the steps of FIG. 5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
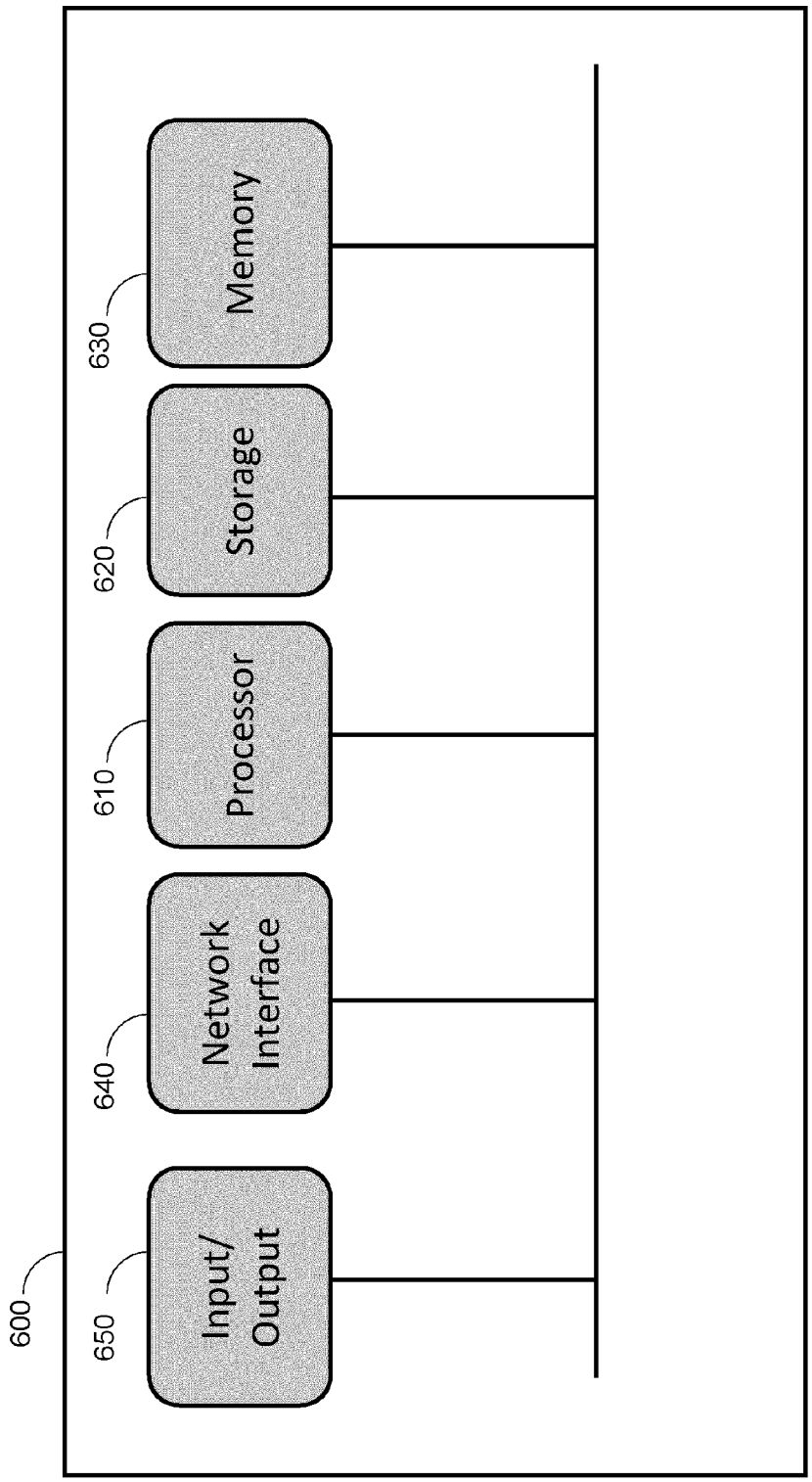
FIG. 6 is a high-level block diagram of an exemplary computer that may be used for fault detection in a component associated with an application programming interface platform.

A high-level block diagram of an exemplary computer that may be used to implement systems, apparatus and methods described herein is illustrated in FIG. 6. Computer 600 comprises a processor 610 operatively coupled to a data storage device 620 and a memory 630. Processor 610 controls the overall operation of computer 600 by executing computer program instructions that define such operations. The computer program instructions may be stored in data storage device 620, or other computer readable medium, and loaded into memory 630 when execution of the computer program instructions is desired. Referring to FIG. 1, for example, platform 200 may comprise one or more components of computer 600. Thus, the method steps of FIG. 5 can be defined by the computer program instructions stored in memory 630 and/or data storage device 620 and controlled by processor 610 executing the computer program instructions. For example, the computer program instructions can be implemented as computer executable code programmed by one skilled in the art to perform an algorithm defined by the method steps of FIG. 5. Accordingly, by executing the computer program instructions, the processor 610 executes an algorithm defined by the method steps of FIG. 5. Computer 600 also includes one or more network interfaces 640 for communicating with other devices via a network. Computer 600 also includes one or more input/output devices 650 that enable user interaction with computer 600 (e.g., display, keyboard, mouse, speakers, buttons, etc.).

Processor 610 may include both general and special purpose microprocessors, and may be the sole processor or one of multiple processors of computer 600. Processor 610 may comprise one or more central processing units (CPUs), for example. Processor 610, data storage device 620, and/or memory 630 may include, be supplemented by, or incorporated in, one or more application-specific integrated circuits (ASICs) and/or one or more field programmable gate arrays (FPGAs).

Data storage device 620 and memory 630 each comprise a tangible non-transitory computer readable storage medium. Data storage device 620, and memory 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 650 may include peripherals, such as a printer, scanner, display screen, etc. For example, input/output devices 650 may include a display device such as a cathode ray tube (CRT), plasma or liquid crystal display (LCD) monitor for displaying information to the user, a keyboard, and a pointing device such as a mouse or a trackball by which the user can provide input to computer 600.

Any or all of the systems and apparatus discussed herein, including exposure engine 106, provisioning and interface engine 108, platform nodes 210, front door component 212, billing management system 214, system management portal 216, reports and analytics element 218, service components 302, enabler components 304, policy components 306 and utility components 308 may be implemented using a computer such as computer 600.

One skilled in the art will recognize that an implementation of an actual computer or computer system may have other structures and may contain other components as well, and that FIG. 6 is a high level representation of some of the components of such a computer for illustrative purposes.

When computer program instructions stored in data storage device 620 are implemented on processor 610, program code segments may combine with processor 610 to provide a unique device that operates analogously to specific logic circuits.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

I claim:

1. An apparatus for run-time fault detection in a component associated with an application programming interface platform, the apparatus comprising:
   a memory storing computer program instructions; and
   a processor communicatively coupled to the memory, the processor configured to execute the computer program instructions, which, when executed on the processor, cause the processor to perform a method comprising:
- determining that the component has been invoked to process a transaction;
- monitoring a forward progress counter to determine whether the component is processing the transaction, wherein the forward progress counter increments at determined intervals when the component is processing the transaction;
- executing a test transaction for the component when a determination is made that the forward progress counter has not incremented for a threshold fault period; and
- generating a fault alarm indicator based on the determination that the forward progress counter has not incremented for the threshold fault period.

2. The apparatus of claim 1, further comprising determining a recovery action for the component based on the fault alarm indicator.

3. The apparatus of claim 1, further comprising transmitting the fault alarm indicator to a fault monitoring component.

4. The apparatus of claim 1, wherein the threshold fault period is a threshold number of time intervals.

5. The apparatus of claim 1, wherein the component includes the forward progress counter.

6. The apparatus of claim 1, wherein the application programming interface platform is an open platform associated with a communication service provider.

7. The apparatus of claim 1, wherein the component is one of a service component, an enabler component and an external component with respect to the application programming interface platform.

8. A non-transitory computer-readable medium storing computer program instructions for fault detection in a component associated with an application programming interface platform, which, when executed on a processor, cause the processor to perform a method comprising:
- determining that the component has been invoked to process a transaction;
- monitoring a forward progress counter to determine whether the component is processing the transaction, wherein the forward progress counter increments at determined intervals when the component is processing the transaction;
- executing a test transaction for the component when a determination is made that the forward progress counter has not incremented for a threshold fault period; and
- generating a fault alarm indicator based on the determination that the forward progress counter has not incremented for the threshold fault period.

9. The non-transitory computer-readable medium of claim 8, further comprising determining a recovery action for the component based on the fault alarm indicator.

10. The non-transitory computer-readable medium of claim 8, further comprising transmitting the fault alarm indicator to a fault monitoring component.

11. The non-transitory computer-readable medium of claim 8, wherein the threshold fault period is a threshold number of time intervals.

12. The non-transitory computer-readable medium of claim 8, wherein the application programming interface platform is an open platform associated with a communication service provider.

13. The non-transitory computer-readable medium of claim 8, wherein the component is one of a service component, an enabler component and an external component with respect to the application programming interface platform.

14. A method for fault detection in a component associated with an application programming interface platform, the method comprising:
- at a processor operatively coupled to a data storage device, determining that the component has been invoked to process a transaction;
- monitoring, by the processor in cooperation with the data storage device, a forward progress counter to determine whether the component is processing the transaction, wherein the forward progress counter increments at determined intervals when the component is processing the transaction;
- executing, by the processor in cooperation with the data storage device, a test transaction for the component when a determination is made that the forward progress counter has not incremented for a threshold fault period; and
- generating, by the processor in cooperation with the data storage device, a fault alarm indicator based on the determination that the forward progress counter has not incremented for the threshold fault period.

15. The method of claim 14, further comprising determining a recovery action for the component based on the fault alarm indicator.

16. The method of claim 14, further comprising transmitting the fault alarm indicator to a fault monitoring component.

17. The method of claim 14, wherein the threshold fault period is a threshold number of time intervals.

18. The method of claim 14, wherein the component includes the forward progress counter.

19. The method of claim 14, wherein the application programming interface platform is an open platform associated with a communication service provider.

20. The method of claim 14, wherein the component is one of a service component, an enabler component and an external component with respect to the application programming interface platform.

* * * * *